United States Patent
Van Laethem

(10) Patent No.: US 6,535,770 B1
(45) Date of Patent: Mar. 18, 2003

(54) ANIMATION DEVICE FOR GRAPHIC OR PLASTIC REPRESENTATIONS

(76) Inventor: Jean-Marc Van Laethem, 38 rue de l'Amiral Mouchez, 75014 Paris (FR)

(*) Notice: Subject to any disclaimer, the term of this patent is extended or adjusted under 35 U.S.C. 154(b) by 0 days.

(21) Appl. No.: 09/559,650

(22) Filed: Apr. 28, 2000

Related U.S. Application Data

(63) Continuation of application No. PCT/FR98/02328, filed on Oct. 30, 1998.

(30) Foreign Application Priority Data

Nov. 3, 1997 (FR) .......................................... 97 13788

(51) Int. Cl.$^7$ ............................................. G05B 15/00
(52) U.S. Cl. .......................... 700/83; 700/163; 345/700
(58) Field of Search ........................... 700/17, 83, 182, 700/163, 98; 340/692, 573.1; 446/175; 345/700

(56) References Cited

U.S. PATENT DOCUMENTS

| | | | | |
|---|---|---|---|---|
| 4,679,077 A | * | 7/1987 | Yuasa et al. | 340/518 |
| 4,930,236 A | | 6/1990 | Hart | 359/192 |
| 5,013,276 A | * | 5/1991 | Garfinkel | 446/14 |
| 5,305,197 A | | 4/1994 | Axler et al. | 340/573 |
| 5,532,680 A | | 7/1996 | Ousborne | 340/567 |
| 5,875,108 A | * | 2/1999 | Hoffberg et al. | 382/181 |

FOREIGN PATENT DOCUMENTS

| | | |
|---|---|---|
| EP | 0139876 | 5/1985 |
| GB | 2146821 | 4/1985 |

OTHER PUBLICATIONS

International Search Report, dated Nov. 30, 1998.
Applicant's comments on the cited references.

* cited by examiner

Primary Examiner—Leo Picard
Assistant Examiner—Kidest Bahta
(74) Attorney, Agent, or Firm—Stevens, Davis, Miller & Mosher, LLP

(57) ABSTRACT

A device for animating a graphical or plastic representation comprises a support for the representation, an animation system for varying the representation and at least one sensor for detecting the presence of a person in a given field of view of the support and for generating a parameter representative of movements and/or gestures of a person in that field. It includes a control system which controls the animation system according to that parameter in response to the detection of a person. It also generates at least one random variable. The control system combines the random variable with the aforementioned parameter to command non-deterministic variations of the representation in response to movements and/or gestures of a detected person.

12 Claims, 8 Drawing Sheets

ANIMATION DEVICE FOR GRAPHIC OR PLASTIC REPRESENTATIONS

This application is a continuation of International PCT Application No. PCT/FR98/02328 filed on Oct. 30, 1998, which designated the United States.

BACKGROUND OF THE INVENTION

1. Field of the Invention

The present invention concerns a device for animating graphical or plastic representations and a system using it.

2. Description of the Prior Art

There are various systems for presenting different images on a common support, such as those used in certain advertising billboards. One such system displays for a preset time period an advertising poster initially wound around top and bottom members of the billboard support. Another system displays for a preset time period an advertising poster made up of juxtaposed vertical strips, each strip being fixed to one side of one of several triangular-profile members. In this way it is possible to display three different images in succession.

These devices can display static images only intermittently and for a preset time period, which tends to reduce the impact of the advertising message. Also, movement is used only to change from one image to another as quickly as possible, which tends to frustrate an observer who has not finished looking at the current image or reading the current message.

One object of the invention is to remedy boredom when observing a graphical or plastic representation by means of an animation device adapted to create an effect of surprise and variety.

SUMMARY OF THE INVENTION

To this end, the invention provides a device for animating a graphical or plastic representation, comprising support means for said representation, animation means for varying said representation, at least one sensor for detecting the presence of a person in a given field of view of said support means and for generating a parameter representative of movements and/or gestures of a person in said field, means for controlling said animation means according to said parameter in response to the detection of a person, and means for generating at least one random variable, wherein said control means include means for combining said random variable with said parameter to command non-deterministic variations of said representation in response to said movements and/or gestures.

The invention also provides the following features:

said sensor includes means for measuring the distance of a detected person from said support means;

said sensor is an ultrasound sensor;

the device includes a plurality of sensors, means for generating a plurality of parameters according to signals delivered by said sensors and means for generating a current state variable of said device according to said parameters and said random variable, said control means controlling said animation means according to said current state variable;

said sensors comprise at least one of a brightness sensor and of a sound sensor respectively adapted to measure the ambient brightness and to detect sound in a field in which said device is placed;

said control means include means for storing a predefined list of state variables, said control means being adapted to control said animation means selectively according to the presence or absence of said current state variable in said list;

said control means include means for producing a predefined sequence of animation of said animation means according to said state variable and for selectively modifying the execution of said animation sequence according to at least one random variable;

said control means include means for selectively interrupting an animation sequence in progress in response to variation of said state variable;

said control means are adapted to control said animation means according to the time since said animation means were placed in a given configuration;

said support means comprise at least one fixed support of a background graphical representation and at least one movable support of a foreground graphical representation and said animation means comprise means for moving said foreground representation movable support relative to said background representation fixed support;

said support means comprise a screen for displaying a video image and said animation means include means for processing said video image.

The device according to the invention is used to animate or to modulate parts of a graphic or plastic representation interactively, i.e. according to environmental parameters measured by electronic sensors. Also, the device according to the invention introduces a random element into the choice and execution of the animation. Taking a random variable into account in the choice and execution of an animation attracts and retains the interest of an observer, as it appeals to their curiosity. The observer wonders, and attempts to identify, which events or combinations of events influence the animation in progress. Moreover, the fact that the animation is rendered non-deterministic by the random variable maintains the effect of surprise and variety, since the same situations can produce significantly different effects. Finally, this also reduces the mechanical or robotic aspect of the animation and strengthens its esthetic impact since the observer appears to perceive a guiding "intelligence" beyond that of a simple robot or automaton.

According to the invention, the graphical or plastic representation also changes in accordance with the reactions of the observer. The device therefore involves the observer personally and directly in the communication established by the graphical or plastic representation and therefore establishes a real two-way communication with the observer. Another advantage of the device is that it enables multiple variants of a graphical or plastic representation to be shown, so maintaining the effect of variety and surprise and avoiding the boredom.

The invention also provides a system for animating graphical or plastic representations comprising:

a plurality of devices for animating graphical or plastic representations, each said device comprising support means for said representation, animation means for varying said representation, at least one sensor for detecting the presence of a person in a given field of view of said support means and for generating a parameter representative of movements and/or gestures of a person in said field, means for controlling said animation means according to said parameter in response to the detection of a person, and means for generating at least one random variable, said control means including means for combining said random variable with said parameter to command non-deterministic variations of said representation in response to said movements and/or gestures, means for enabling communication between said devices, and means for controlling the animation means of at least some of said devices according to the state of the control means of at least one of said devices.

BRIEF DESCRIPTION OF THE DRAWINGS

The invention will be better understood in the light of the accompanying drawings, in which.

DETAILED DESCRIPTION OF THE PREFERRED EMBODIMENTS

Figure 1:
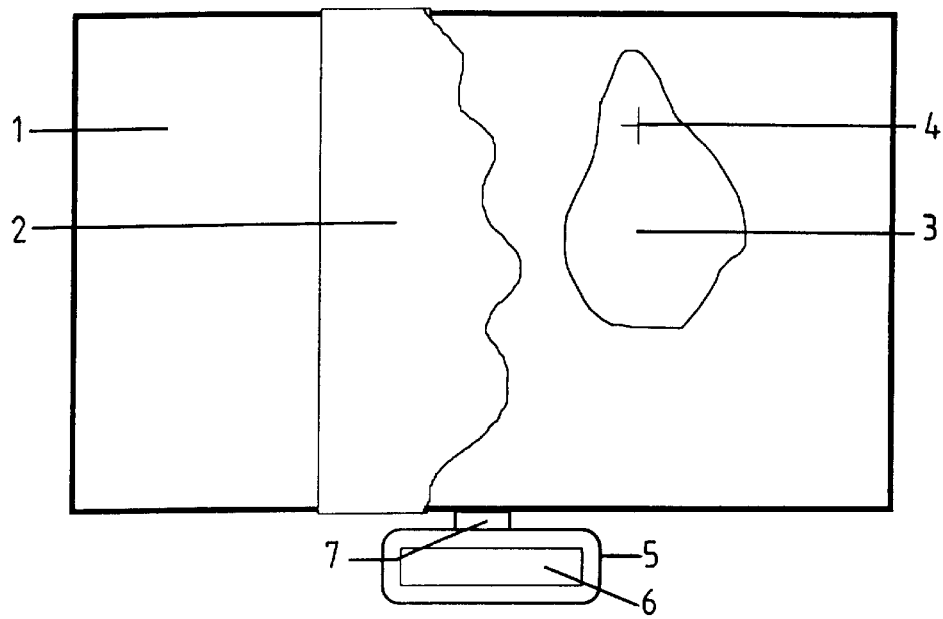
FIG. 1 is a plan view of the front face of one element of a graphical representation animated by a device constituting a first embodiment of the invention.
Figure 2:
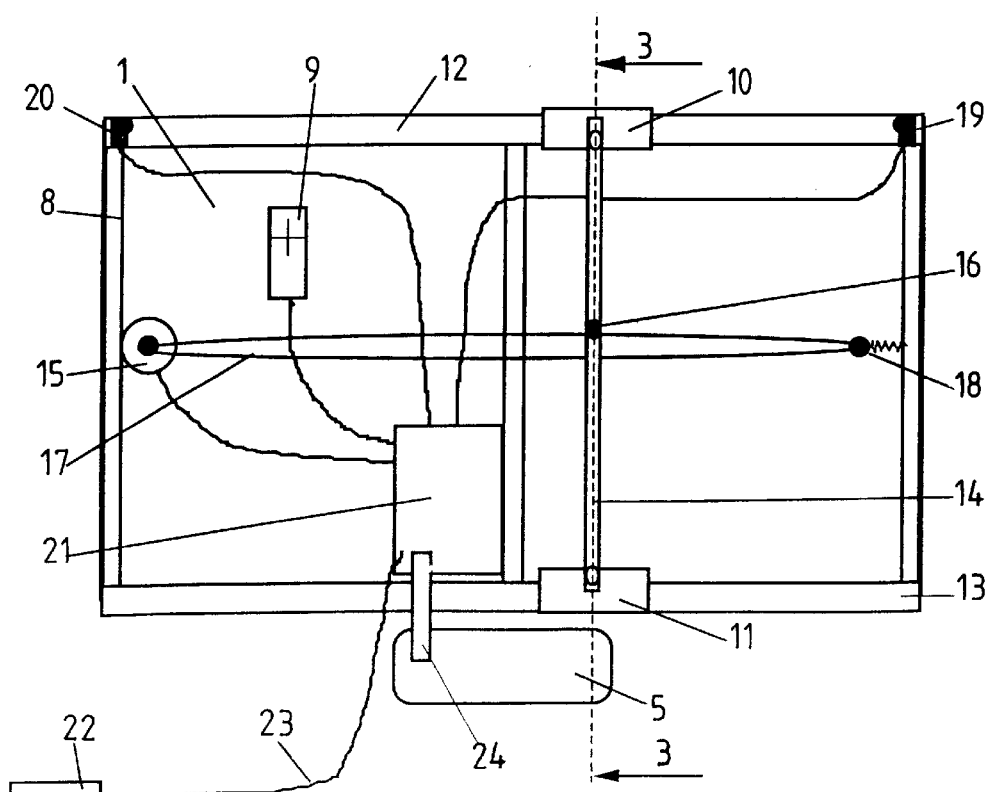
FIG. 2 is a plan view of the rear face of the graphical representation element from FIG. 1.
Figure 3:
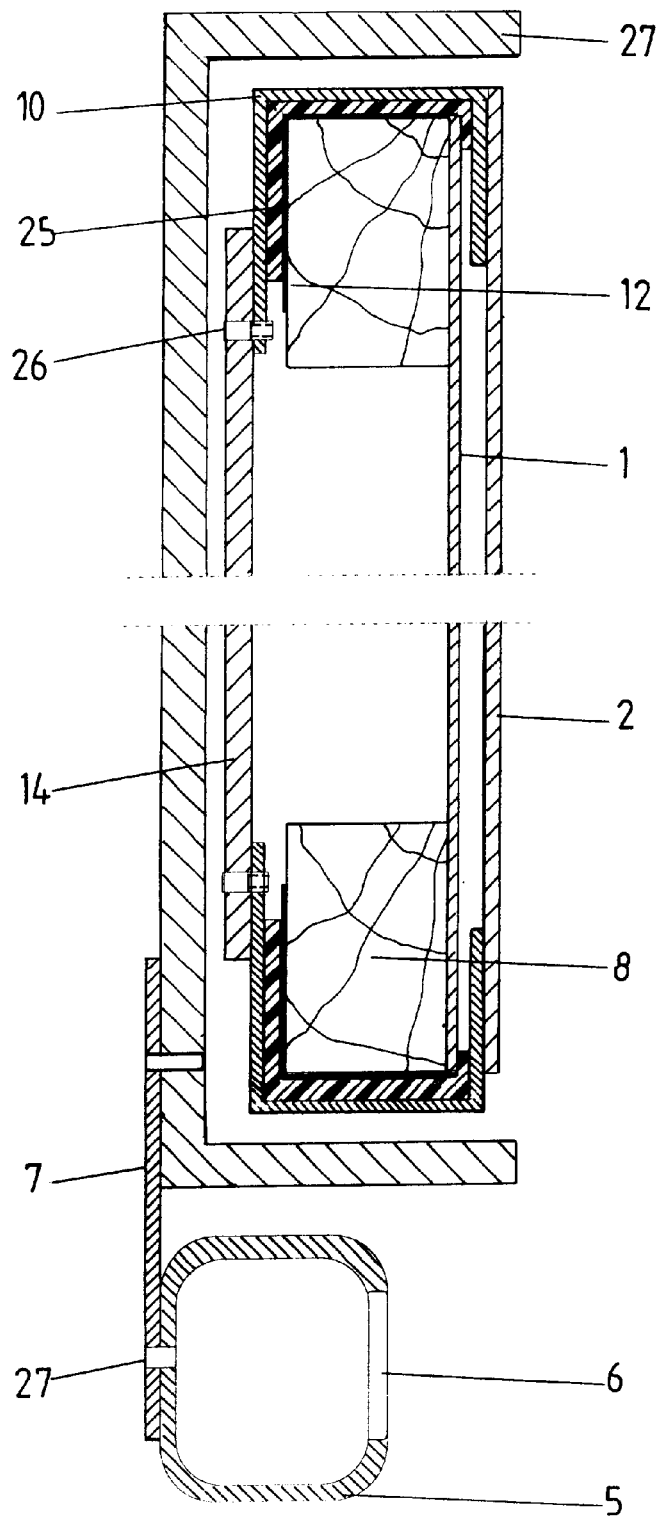
FIG. 3 is a view in section taken along the line 3—3 of a system for imparting movement in translation used in the first embodiment of the device according to the invention.

Referring to FIGS. 1 to 3, a first embodiment of an animation device according to the invention includes a generally rectangular fixed background graphical representation support 1, a first mobile foreground graphical representation support 2 that can move parallel to the top and bottom edges of the background graphical representation support 1 and a second foreground graphical representation support 3 which can rotate about a rotation axis 4. The background graphical representation support 1 can be a painted canvas, a photograph or any other type of graphical or pictorial representation.

The distances between the background graphical representation support 1 and the foreground mobile graphical representation supports 2 and 3 are defined so that the moving members can cross without impeding each other's movement.

The background graphical representation support 1 is supported by a rectangular frame 8 which makes the assembly rigid.

In the embodiment shown in FIG. 1, a unit 5 combining several electronic sensors is fixed by a fixing lug 7 to the rear side of the bottom edge of the frame 8 supporting the graphical representation support 1. An opening 6 in the unit 5 enables the electronic sensors to react to the presence of an observer.

In a first embodiment of the invention, shown in FIG. 2, an electric motor 9 rotates the mobile member 3 about the axis 4 directly or via a speed reduction system of pulleys or gears.

The top and bottom parts of the mobile member 2 moving in translation are fixed to U-sections 10 and 11 sliding on respective angle-irons 12 and 13 fixed to the top and bottom members of the frame 8.

The U-sections 10 and 11 are joined together by a link 14 connected to the motor 15 by way of an attachment point 16 and a transmission belt 17. The transmission belt 17 is tensioned between the motor 15 and pulley by a tension spring 18.

End of travel switches 19 and 20 detect the end of travel of the mobile member 2 in its extreme positions, after the U-section 10 abuts on them. The end of travel switches 19 and 20 can employ mechanical or magnetic contacts. In the latter case, the magnets which make the electrical contact are fixed to one of the U-sections 10 of the mobile support.

An electronic printed circuit 21 includes signal processing, control, power supply regulation electronic circuits and a processor. The printed circuit 21 is connected to the sensors in the unit 5 via a ribbon cable 24. It is also connected to the end of travel switches 19 and 20 and the motors 9 and 15. Finally, it is connected to the AC line voltage via a mains adapter 22 and its connecting cable 23.

FIG. 3 shows in section a mechanism for imparting movement in translation used in the device shown in FIGS. 1 and 2. The purpose of this mechanism is to bring about low-friction sliding of the support 2 relative to the support 1. The U-sections 10 and 11 are adjusted to cover the respective angle-irons 12 and 13 completely and the front panel of the background graphical representation support 1 partially. The inside of the U-sections 10 and 11 is covered with a plastics material 25 to facilitate relative sliding between them and the angle-irons 12 and 13.

The link 14 is fixed to the U-sections 10 and 11 by screws 26. The mobile support 2 is fixed to the front face of the U-sections 10 and 11. In an embodiment that is not shown, and in order to move mobile supports whose size is such that they do not cover the entire height of the background graphical representation support 1, the mobile support 2 is held and guided by a single top or bottom U-section 10 or 11. In another embodiment, also not shown, the mobile support 2 can be guided and held by lateral Usections, thereby sliding on the left and right members of the frame 8.

As shown in section in FIG. 3, the device as a whole is placed in an "American system" type frame 27 fixed to the right and left members of the frame 8. The unit 5 containing the sensors, in which there is a window 6, is fixed by the fixing lug 7 to the rear face of the bottom member of the "American system" frame 27, rather than directly to the frame 8 as shown in FIGS. 1 and 2.

When the device is switched on, the mobile graphical representation supports 2 and 3 move toward their reference position. The top U-section 10 comes into contact with the switch 19, which determines the reference position of the mobile support 2. The control electronic circuit on the printed circuit 21 takes account of the parameters of the environment of the device by means of sensors such as brightness sensors and sensors which detect the presence of an observer and the distance to the observer. The control electronic circuit initiates and executes a sequence of prerecorded movements of the mobile supports 2 and 3 by controlling the motors 15 and 9 accordingly. The choice of the sequence of movements and the execution of the sequence chosen are functions of the environmental parameters and a random variable.

The sensors in the unit 5 respond to any change in the environment such as movement of the observer or a change of brightness. The control electronic circuit can interrupt the sequence in progress and start a new one.

Figure 4:
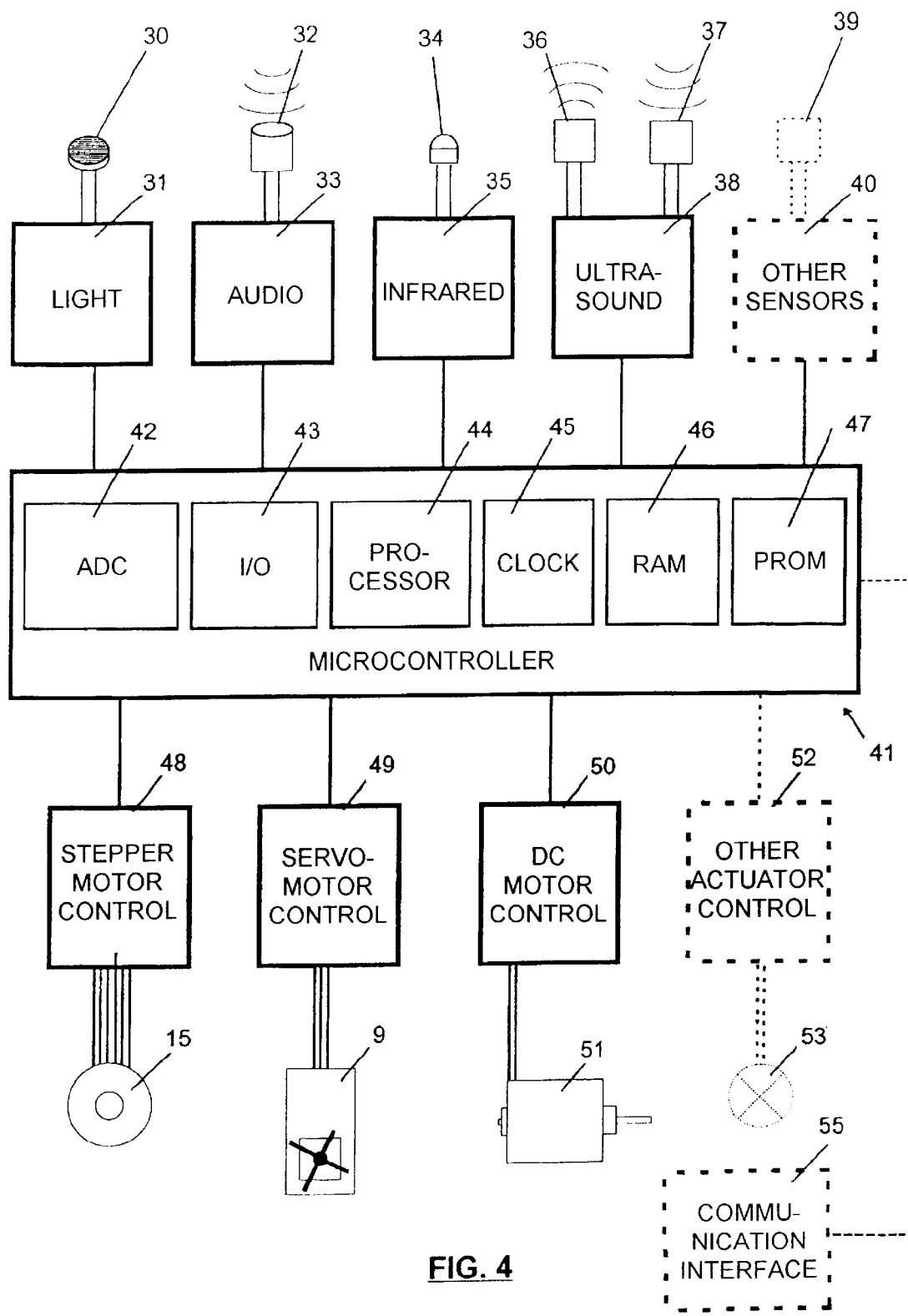
FIG. 4 is a block diagram of an electronic control system of the first embodiment of the device according to the invention shown in FIGS. 1 to 3.

Referring to FIG. 4, the electronic control system of the first embodiment of a device according to the invention shown in FIGS. 1 to 3 is based on a microcontroller 41 connected to sensors and actuators. The microcontroller 41 includes a processor 44 clocked by a clock 45, a non-volatile PROM or Flash PROM 47 containing the software, a volatile RAM 46 containing the variables, one or more analog/digital converters 42 and digital inputs/outputs 43 of the microcontroller 41.

A brightness sensor 30 is connected to the microcontroller 41 through a sensor output signal processing circuit 31. The processing circuit 31 can be either a threshold detector or an amplifier circuit. A threshold detector applies to the input of the microcontroller a binary signal which is a function of a predefined brightness threshold.

An amplifier circuit applies to the input of the analog/digital converter 42 a signal representative of the ambient brightness.

A microphone 32 is connected to the microcontroller 41 via an audio processing circuit 33. The circuit 33 can be an amplifier circuit, a spectrum analyzer or a voice recognition circuit.

In the case of an amplifier circuit, it delivers the amplified audio signal to the analog/digital converter 42. The signal is then sampled by the analog/digital converter 42 at a frequency which is twice the highest frequency to be measured.

If the audio processing circuit 33 is an audio spectrum analyzer, the outputs of the processing circuit deliver analog signals whose values are representative of the amplitudes of the audio signal in each frequency band. Both outputs are applied to a plurality of analog/digital converters in order to deliver to the processor 44 values representative of the intensity of the signal in the predefined frequency bands.

If the audio signal processing circuit 33 is a voice recognition circuit, words to be recognized are stored in a dedicated integrated circuit via the microphone 32. If the observer says a word that has previously been stored, the voice recognition circuit activates the output corresponding to that word and indicates it to the processor 44.

An infrared light sensor 34 is connected to the microcontroller 41 via an infrared processing circuit 35. The infrared processing circuit 35 can be either an amplifier circuit or a decoder circuit associated with an infrared remote controller.

If the infrared processing circuit 35 is an infrared amplifier, it delivers to the microcontroller 41, after filtering out ambient infrared radiation, a binary signal corresponding to the infrared signal emitted by any audio or video remote controller. The processor 44 can therefore detect the presence of an infrared emission by sampling the received signal.

If the infrared processing circuit 35 is an infrared decoder associated with a specific infrared remote controller supplied with the device according to the invention, the infrared decoder 35 transmits to the microcontroller 41 a digital signal which identifies the key pressed on the remote controller.

An ultrasound emitter 36, an ultrasound receiver 37 and an ultrasound transmit/receive circuit 38 constitute a circuit for detecting the observer or measuring the distance to the observer. This circuit delivers to the microcontroller 41 a signal representative of the time elapsed between ultrasound pulses leaving the ultrasound emitter 36 and being picked up by the ultrasound receiver 37 after they are reflected by the body of the observer.

In an embodiment that is not shown, the multiplicity of ultrasound emitters 36 and ultrasound receivers 37 are disposed horizontally below the bottom member of the graphical representation. The ultrasound receivers 37 detect movements of the observer, not only when they move around within the space covered by the sensors, but also movements of their arms (e.g. arms crossed or held out to the front).

The device according to the invention can include one or more other sensors 39, such as a passive infrared sensor, an electrostatic sensor, a thermal sensor or contact sensors such as switches or pressure sensors. The processing circuits 40 associated with these other sensors 39 can be of the threshold detector type delivering a binary signal or of the amplifier type associated with an analog/digital converter, as appropriate.

In embodiments that are not shown, the various sensors responsive to the presence of the observer and parameters of the environment can be placed directly on the background graphical representation support 1 or combined in an L-shaped cover partly covering one end of the background graphical representation support 1.

FIG. 4 shows also actuators that can be used in the first embodiment of the device according to the invention.

One or more stepper motors 15 are connected to the microcontroller 41 via a stepper motor control circuit 48. The control circuit 48 delivers the current necessary to drive the motors, monitors their rotation direction and delivers the step pulses, and therefore the number of steps to be effected and the rotation speed of each of the stepper motors.

One or more servomotors 9 are connected to the microcontroller 41 via a control circuit 49 for the servomotors 9. The control circuit 49 delivers to the servomotors 9 pulse-width-modulated pulses representative of the position that the servomotors must maintain and the current necessary to drive them and to maintain their position.

One or more DC motors 51 can be connected to the microcontroller 41 via a DC motor control circuit 50. The control circuit 50 delivers the current to drive them and monitors their direction and speed of rotation.

Other actuators 53 can be controlled by the microcontroller 41, such as synchronous motors, light-emitting diodes or incandescent lamps, perfume diffusers or audio amplifiers associated with loudspeakers for reproducing prerecorded sounds. The control circuits 52 for the other actuators 53 deliver the necessary signals and power for them to operate.

The operation of the electronic control system of the first embodiment of the device described hereinabove will now be described.

If an observer approaches the system, they are detected by the circuit 38 for measuring the distance to the observer, which supplies an indication of that distance to the microcontroller 41. The information is combined with values measured by other sensors and with a random variable generated by the processor 44 in order to choose one sequence from the animation sequences stored in the PROM 47. The processor 44 interprets and executes the steps of the chosen sequence by positioning the motors 15, 9 and 51 at prerecorded positions and modulating movement parameters such as speed and delay according to random variables. If the observer approaches and speaks, this triggers an animation sequence informing them that their communication is being taken into account. Thus any variation in the parameters measured by the sensors is taken into account in choosing and executing these sequences.

Figure 5:
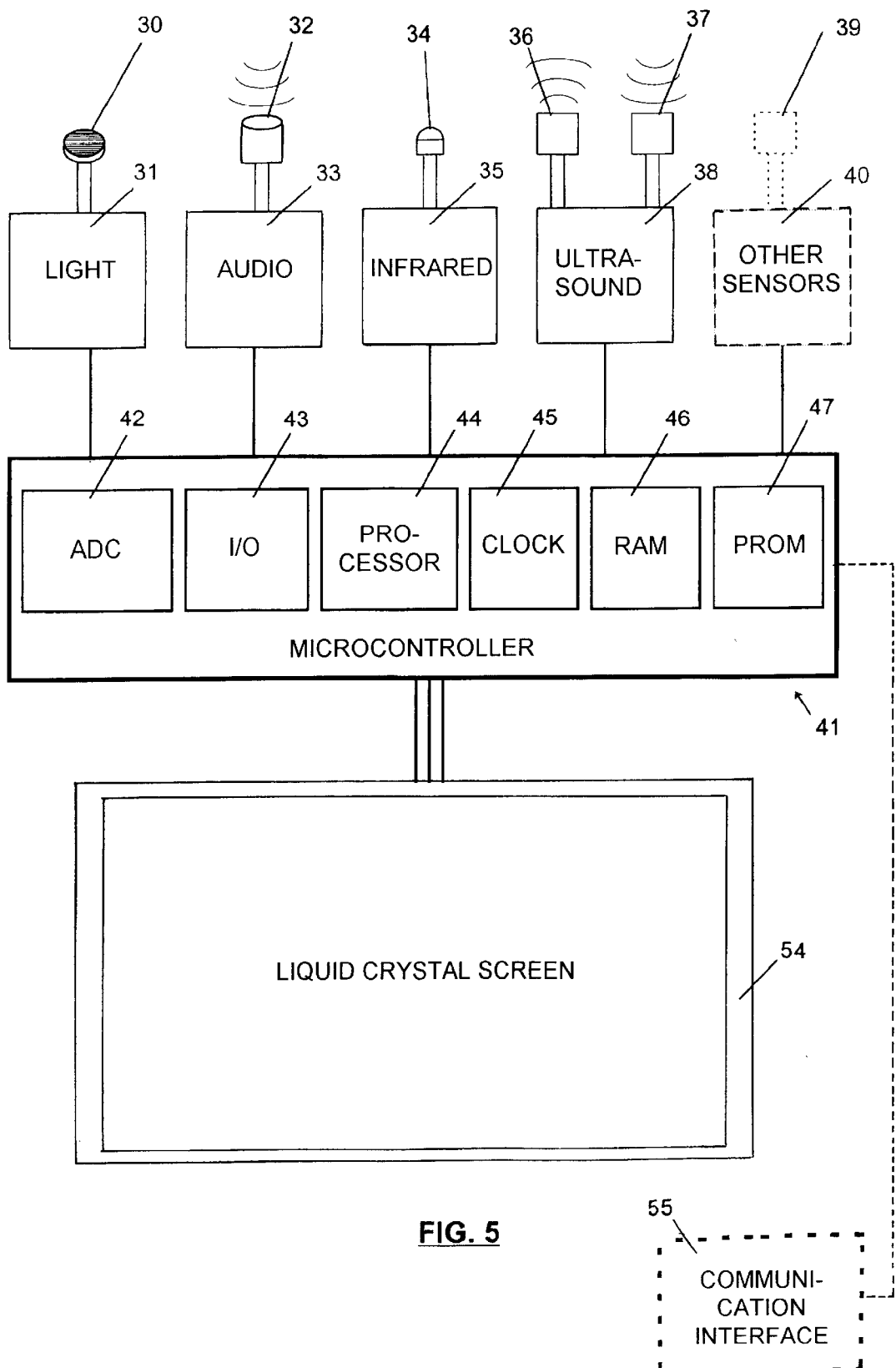
FIG. 5 is a block diagram of an electronic control system of a second embodiment of a device according to the invention.

In a second embodiment of the invention, shown in FIG. 5, the system according to the invention uses a liquid crystal screen 54 in place of the background and foreground graphical and/or pictorial representation supports driven by electric motors.

The second embodiment of the device changes some parts or the whole of the image displayed. The parameters of the image that can change according to the measurements effected by the sensors are the brightness, contrast, color saturation, viewing angle, position and color of the light source, for example. In an embodiment of this kind elements of the image can be moved by fusing, superposing or deforming ("morphing") one part of the image with another.

In a third embodiment of the invention, not shown, the system according to the invention is used to animate parts of a plastic representation such as a sculpture. This embodiment of the device changes one or more elements of the plastic representation in three dimensions. In this case, the control electronics, motors and sensors are accommodated in one or more elements of the plastic representation or in a plinth to which it is secured.

The invention will now be described with reference to the diagrams and flowcharts of FIGS. 6 to 10. Hereinafter:

the term "state variable" refers to a logical combination of the state of the sensors at a given time combined with one or more random variables generated by the system, and the term "event" refers to a movement, a wait or a branch.

A movement is a situation in which a part of the graphical representation changes from a start configuration to an end configuration within a predetermined time period.

A wait is a period of time during which a part of the graphical representation which can be animated remains unchanged.

A branch is a command to run a new animation sequence.

An animation sequence is a succession of predefined movement, wait or branch events which is executed according to a state variable. Like an event, a sequence can be interruptible or non-interruptible. Each event of a sequence can be modulated by one or more random variables.

The state of the system or the device is the set of animation sequences to be executed in response to a particular state variable.

Figure 6:
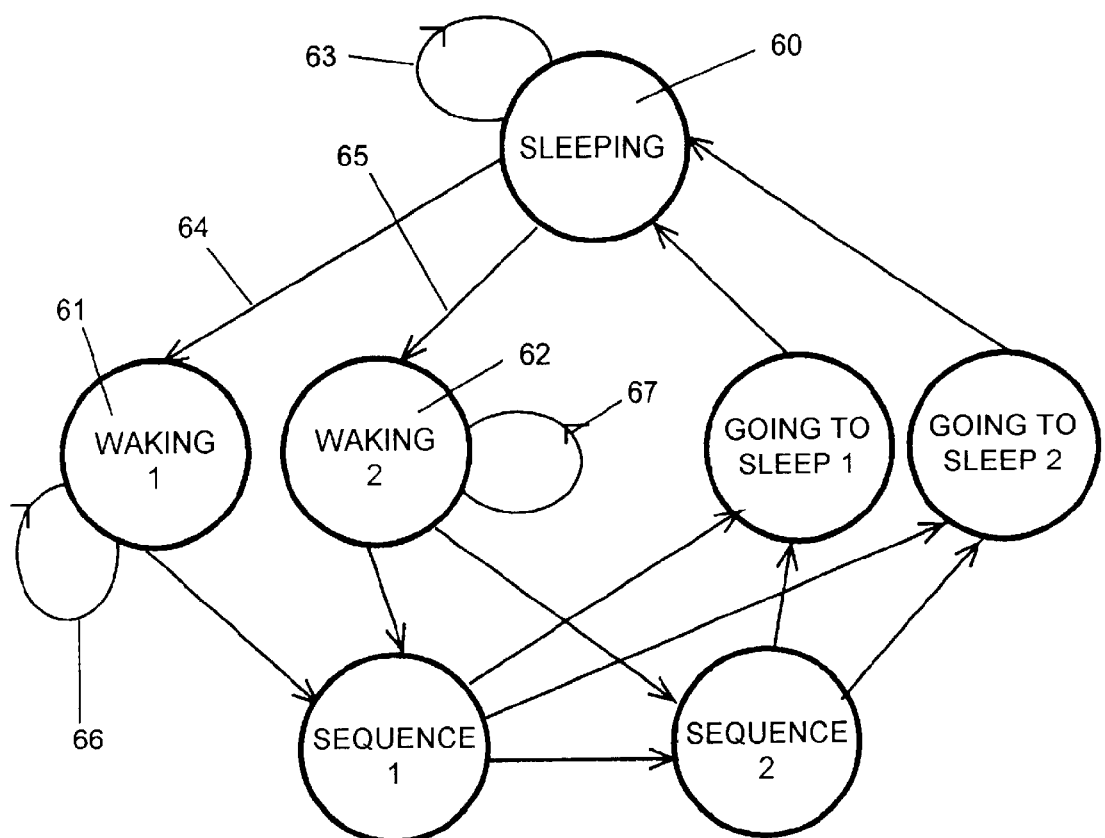
FIG. 6 is a diagram showing how the device according to the invention changes state according to sensor measurements and a random variable.

FIG. 6 is a diagram showing how the system generates a state variable according to measurements performed with the aid of the sensors and a random variable generated by the microcontroller 41. The diagram is a state diagram of the kind used to describe a finite state machine. The circles 60, 61 and 62 represent states of the system corresponding to the set of prerecorded animation sequences that can be executed and modified. FIG. 6 shows an embodiment which comprises seven system states: a Sleeping state, two Waking states, two Going to sleep states and two intermediate states. The arrows 64 and 65 represent the state variables which enable the system to leave the Sleeping state and the arrows 63 and 66 define the state variables which cause the system to remain in the Sleeping state or the Waking state 1, respectively.

For example, if the ambient brightness is very low or even zero around the device, and if the state variable 63 is defined by the clause "IF the value of the brightness sensor is 0 OR if it is 1 for less than 15 seconds THEN go to the Sleeping state", the system executes the animation sequence associated with the Sleeping state. To give another example, event 64 is defined by the clause "IF brightness sensor=1 AND random variable≧80% THEN go to Waking state 1" and the event 65 is defined by the clause "IF brightness sensor=1 AND random variable<80% AND observer at less than 3 meters THEN go to Waking state 2". If a person enters the room in which the device is located, turns on the light and approaches to within three meters of the device, it executes the Waking 2 sequence in 80% of cases. This example shows how a random variable, generated by a change of sensor state, varies the animation sequence in order to maintain an effect of surprise and variety.

Figure 7:
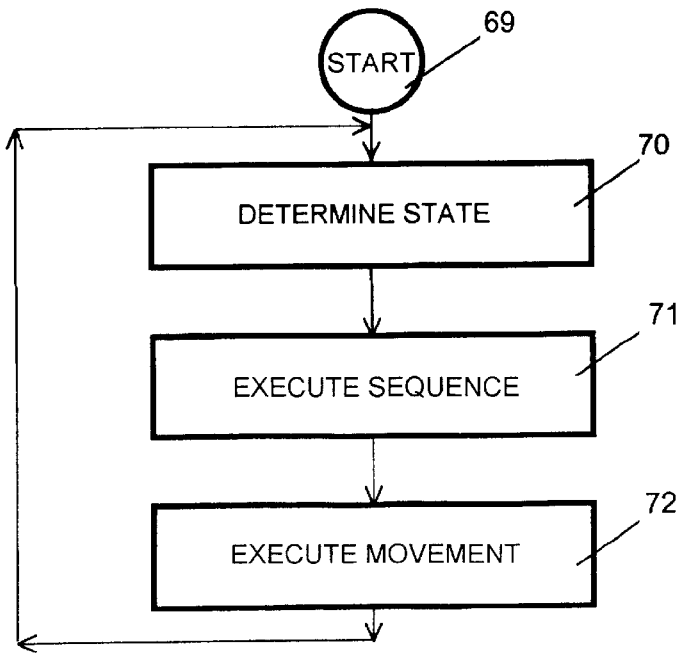
FIG. 7 is a flowchart showing three processes necessary for implementing the animation device according to the invention.

FIG. 7 shows the three processes necessary to implement the device according to the invention. After a reset phase on power up symbolized by the "Start" event 69, the "Determine State" first process 70 defines the state of the system according to a state variable established by combining the state of the sensors with a random variable. The "Execute Sequence" second process 71 interprets, executes and modifies the prerecorded animation sequences corresponding to the current state of the system. The "Execute Movement" third process 72 animates the mobile parts of the graphical representation controlled by the device according to the events sent by the "Execute Sequence" process 71. These processes execute in parallel and communicate with each other via global variables to enable virtually instantaneous movement in response to changes of the state of the sensors, if necessary. Each of the three processes is described in more detail below.

Figure 8:
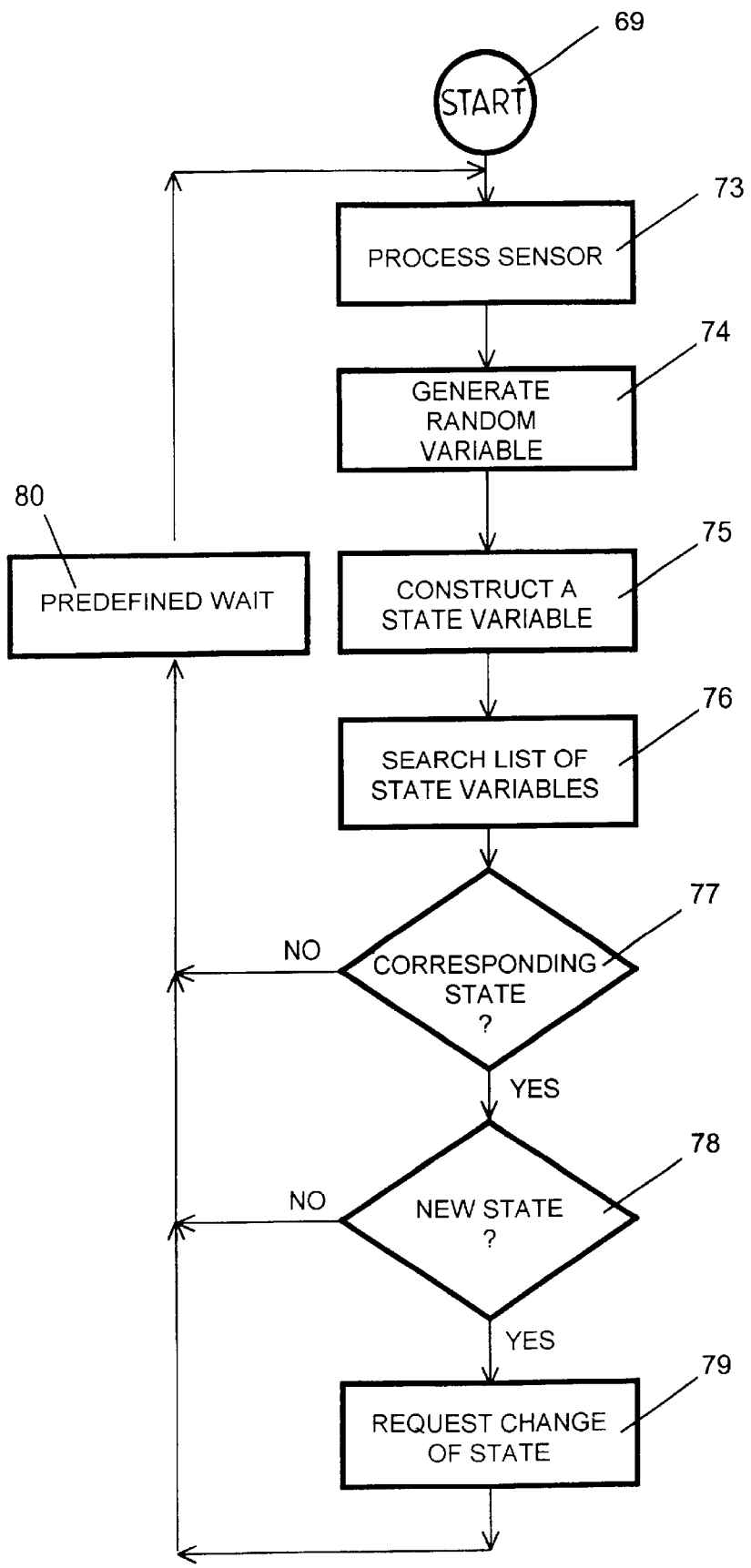
FIG. 8 is a flowchart showing how a random variable is introduced into the choice of an animation sequence.

FIG. 8 is a flowchart showing the "Determine State" first process 70 from FIG. 7. The flowchart shows how a random variable is introduced into the choice of the animation sequence to be performed. The "Start" event 69 symbolizes the reset phase executed on powering up the system and enabling proper execution of the three main processes from FIG. 7. The state of the various sensors is first taken into account in step 73. The system then generates a random variable in step 74. That random variable is then combined with the state of the various sensors to create a state variable in step 75. That state variable represents the state of the sensors at a time T combined with the random variable generated by the system in step 74.

The state variable created in this way is used in step 76 to search a list of predefined state variables to see if there is a state corresponding to the state variable generated in step 75 (test 77). If yes, in step 78 the system performs a new test to determine if the state of the system corresponding to the state variable of step 75 involves a change of state relative to the current state. If yes, a change of state request is generated in step 79 and is acted on by the "Execute sequence" process 71.

After step 79, the system goes to step 80 which corresponds to a wait before repeating the process from step 73. Likewise, if the result of test steps 77 and 78 is negative, the system returns to step 73 after the waiting step 80.

Figure 9:
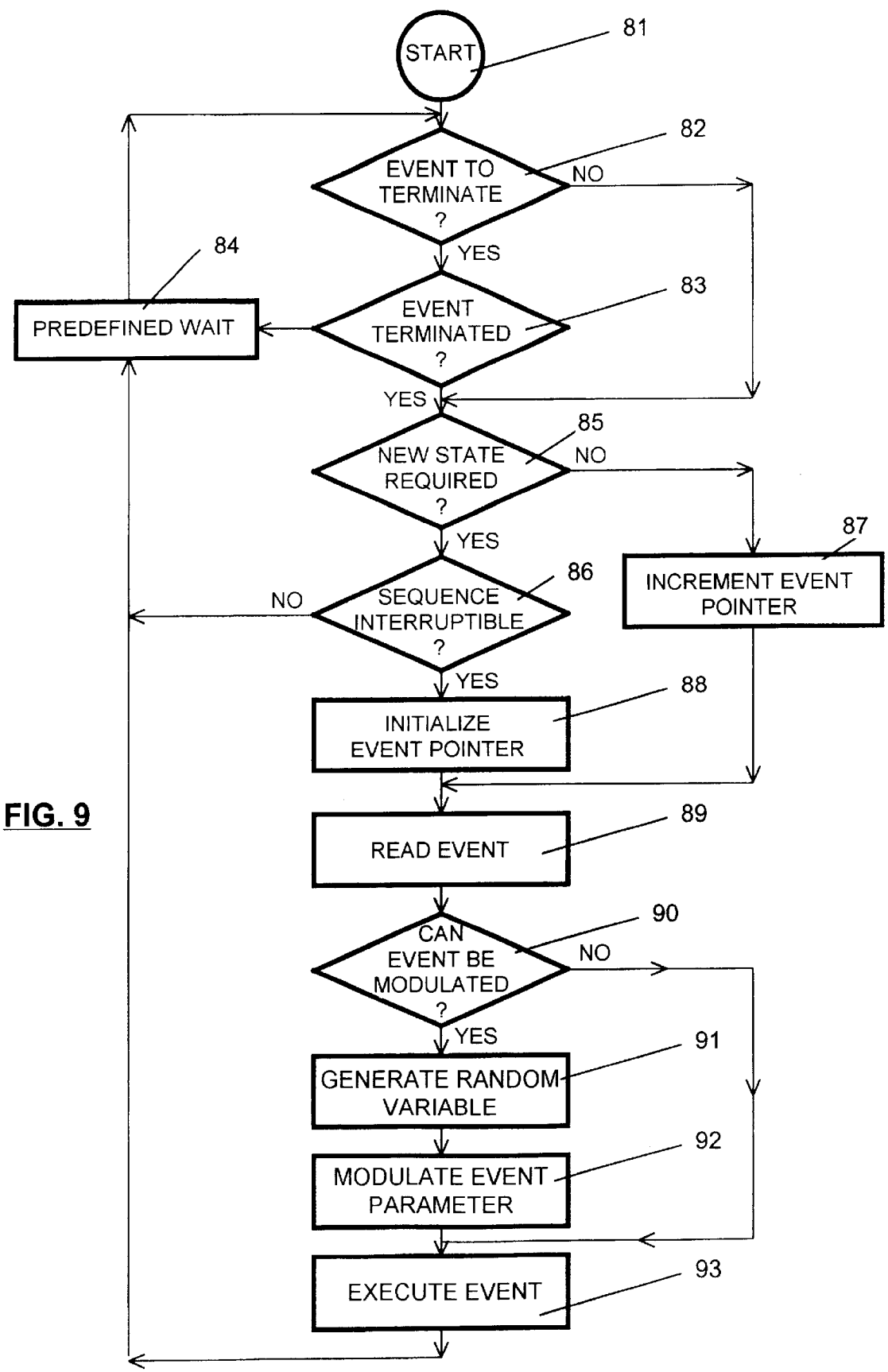
FIG. 9 is a flowchart showing how a random variable is introduced into the execution of a current animation sequence.

FIG. 9 is the flowchart of the "Execute Sequence" process 71 from FIG. 7. The flowchart shows the management of the animation sequences and how a new random variable affects the execution of the current animation sequence in order to maintain an effect of surprise and discovery.

The events of an animation sequence are characterized by parameters which can be modified by a random variable. For example, a movement is characterized by a final position, a speed, a movement profile and a parameter indicating to what degree the movement can be interrupted or not to start a new sequence after a change of state of the system. Each of these parameters of a movement can be modulated by one or more random variables to make the animation sequence slightly different each time it is executed.

Referring to FIG. 9, the "Start" step 81 corresponds to a reset phase executed when the system is powered up. A first test is performed in step 82 to determine if the event currently being executed must be terminated before executing the next one. If yes, a test step 83 determines if the event in progress has finished. If the result of test step 83 is negative, the system returns to step 82 after a waiting step 84. If the result of test step 82 is negative (the current event must not be terminated before executing the next event) or the result of test step 83 is positive (event terminated), the system determines in step 85 if a new state is required. A change of state request can be sent in step 79 of the "Determine state" process (FIG. 8). If the response is in the affirmative (test step 85), the system determines in step 86 if the current sequence can be interrupted. If not (test step 86), the system returns to step 82 after a predefined waiting step 84. If the result of the test step 86 is positive (the sequence can be interrupted), the system initializes an event pointer in step 88 to point to the first event of the animation sequence corresponding to the new state of the system. The event to be executed is read in step 89. If the result of the test step 85 is negative (no change of state required), the event pointer is incremented in step 87 to point to the next event in the current animation sequence and the event to be executed is read in step 89.

In step 90 the system determines if the event to be executed can be modulated, i.e. if some of its parameters can and must be modified according to a random variable. For example, the parameters of an event such as the speed of a movement, the length of a wait or the probability of a branch are parameters that can be modulated. If the result of the test step 90 is negative, the movement is executed without change in step 93. If the result of the test step 90 is positive (event can be modulated), a random variable is generated in step 91. In step 92 that random variable is combined with the parameters of the current event which can be modulated to create an event of the same type as that obtained in step 89 but in which the parameters which can be modulated may be different. The modulated event created in this way in step 92 is then executed in step 93. In the case of a movement, execution consists in adding a movement to the list of the movements in progress, as described below. The process is then repeated from step 82 after a predefined waiting step 84.

Figure 10:
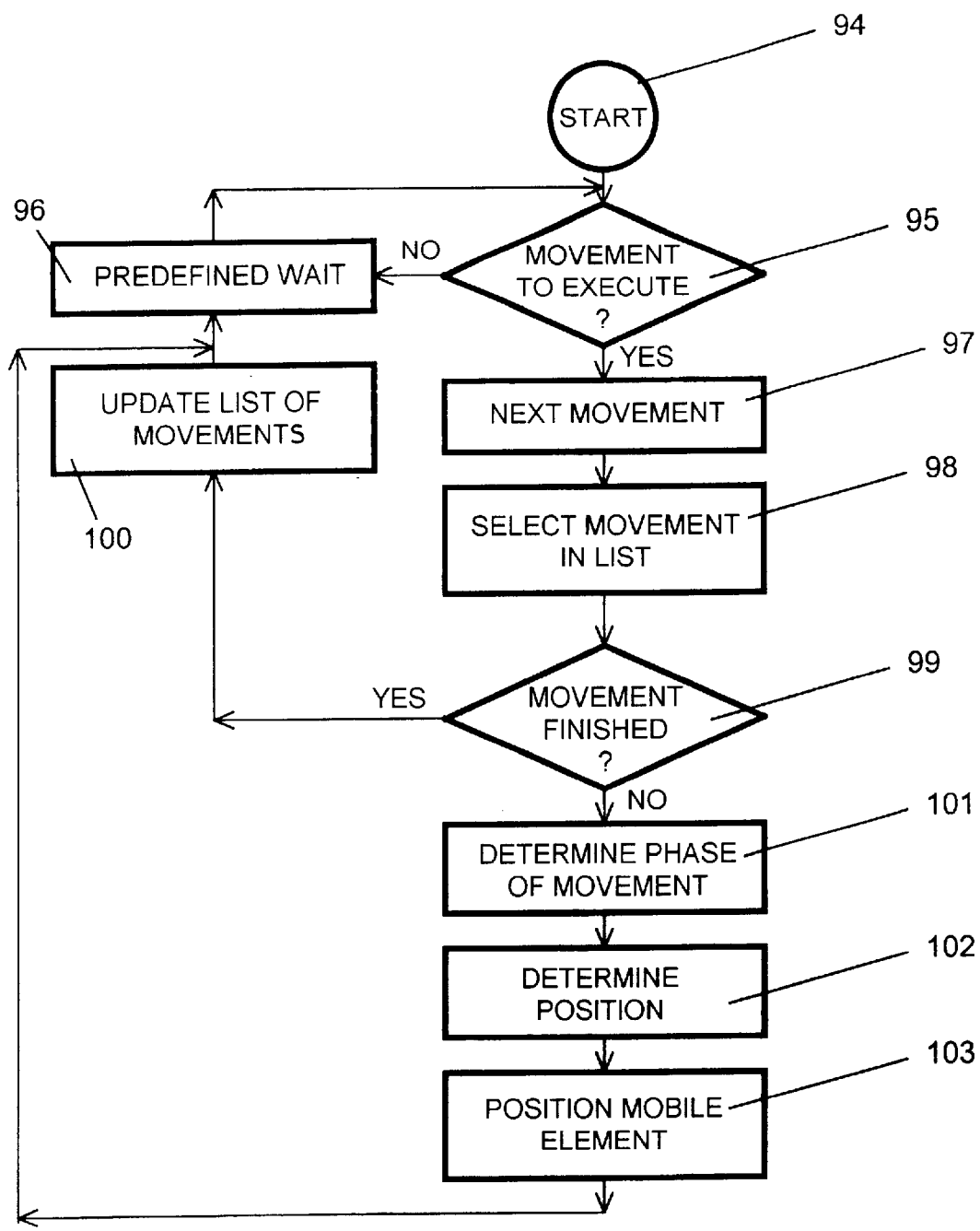
FIG. 10 is a flowchart showing how actuators are controlled in the first embodiment of the invention shown in FIGS. 1 to 3.

FIG. 10 is the flowchart of the "Execute Movement" process 72 from FIG. 7. The flowchart shows how mobile parts of a graphical representation animated by the device according to the invention are moved.

The "Start" step 94 symbolizes the reset phase on powering up which is required for the process to be executed correctly. The system first determines in a test step 95 if there is at least one movement to be executed. If not, it waits for a particular period of time in step 96 before repeating the test in step 95. If the result is positive, it increments the movement pointer in step 97 to select the movement to be managed from the list of movements in progress in step 98. In step 99 a test determines if that movement has finished. If the result is positive, it updates the list of movements in progress in step 100 and returns to step 95 after the waiting step 96.

In the case of a negative result of the test step 99 (the movement has not finished), the system determines the current phase of the movement in step 101. The phase of a movement is an acceleration, deceleration or constant speed phase, depending on the movement profile. In step 102 the system determines the next position that the moving element must occupy from its current position, phase and speed. In step 103 the mobile element corresponding to the movement in progress is positioned at the position defined in step 102. The system then waits for a predefined time period in step 96 before resuming the process at step 95.

The animation device for graphical or plastic representations described above functions autonomously in accordance with parameters measured by the sensors and 10 random variable(s) generated by the processor 44.

It is possible for a plurality of animation devices of the type described above, with different or the same representations, to communicate with each other via cable or wireless communication means. To this end, the microcontroller 41 of each device is equipped with a communication interface 55, as shown in chain-dotted outline in FIGS. 4 and 5. This produces a system made up of a plurality of devices in which the graphical or plastic representations of some devices are slaved by their microcontroller 41 to those of one or more other devices, and consequently synchronized according to the state of the other device(s). For example, one of the devices can be master device and the others slave devices.

It goes without saying that the embodiments described are merely examples and that they can be modified without departing from the scope of the invention. Thus although the embodiment of the invention described hereinabove is illustrated by a twodimensional graphical or pictorial representation, the device and the system according to the invention can be applied to plastic representations in three dimensions, such as a sculpture.

What is claimed is:

1. Device for animating a graphical or plastic representation, comprising support means for said representation, animation means for varying said representation, at least one sensor for detecting the presence of a person in a given field of view of said support means and for generating at least a parameter representative of movements and/or gestures of a person in said field, means for controlling said animation means according to said parameter in response to the detection of a person, and means for generating at least one random variable, wherein said control means include means for combining said random variable with said parameter to command non-deterministic variations of said representation in response to said movements and/or gestures.

2. Device according to claim 1, wherein said sensor includes means for measuring the distance of a detected person from said support means.

3. Device according to claim 1, wherein said sensor is an ultrasound sensor.

4. Device according to claim 1, wherein it includes a plurality of sensors, means for generating a plurality of parameters according to signals delivered by said sensors and means for generating a current state variable of said device according to said parameters and said random variable, said control means controlling said animation means according to said current state variable.

5. Device according to claim 4, wherein said sensors comprise at least one of a brightness sensor and of a sound sensor respectively adapted to measure the ambient brightness and to detect sound in a field in which said device is placed.

6. Device according to claim 4, wherein said control means comprise means for storing a predefined list of state variables, said control means controlling said animation means selectively according to the presence or absence of said current state variable in said list.

7. Device according to claim 6, wherein said control means include means for producing a predefined sequence of animation of said animation means according to said state variable and for selectively modifying the execution of said animation sequence according to at least one random variable.

8. Device according to claim 7, wherein said control means include means for selectively interrupting an animation sequence in progress in response to variation of said state variable.

9. Device according to claim 1, wherein said control means control said animation means according to the time since said animation means were placed in a given configuration.

10. Device according to claim 1, wherein said support means comprise at least one fixed support of a background graphical representation and at least one movable support of a foreground graphical representation and said animation means comprise means for moving said foreground representation movable support relative to said background representation fixed support.

11. Device according to claim 1, wherein said support means comprise a screen for displaying a video image and said animation means include means for processing said video image.

12. System for animating graphical or plastic representations comprising:

a plurality of devices for animating graphical or plastic representations, each said device comprising support means for said representation, animation means for varying said representation, at least one sensor for detecting the presence of a person in a given field of view of said support means and for generating a parameter representative of movements and/or gestures of a person in said field, means for controlling said animation means according to said parameter in response to the detection of a person, and means for generating at least one random variable, said control means including means for combining said random variable with said parameter to command non-deterministic variations of said representation in response to said movements and/or gestures, means for enabling communication between said devices, and means for controlling the animation means of at least some of said devices according to the state of the control means of at least one of said devices.

* * * * *